(No Model.)
F. HICKMAN.
HOSE NOZZLE.
No. 270,064. Patented Jan. 2, 1883.
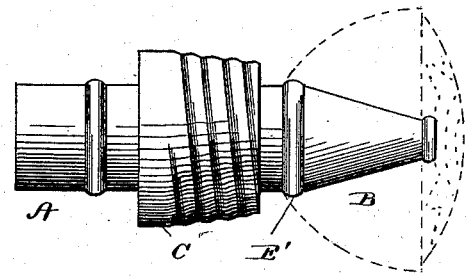
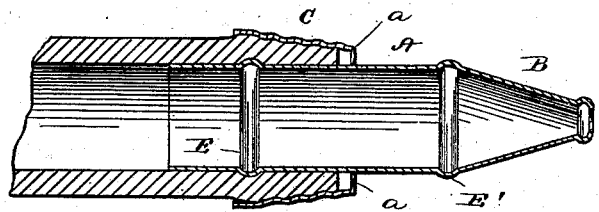
Witnesses.
Edwin L. Yewee
N. Aubrey Toulmin
Inventor:
Francis Hickman
By E. M. Alexander
Attorney.

UNITED STATES PATENT OFFICE.

FRANCIS HICKMAN, OF NEW YORK, N. Y.

HOSE-NOZZLE.

SPECIFICATION forming part of Letters Patent No. 270,064, dated January 2, 1883.

Application filed April 19, 1882. (No model.)

*To all whom it may concern:*

Be it known that I, FRANCIS HICKMAN, of New York, in the county of New York, and in the State of New York, have invented certain new and useful Improvements in Spun and Drawn Metal Hose-Nozzles; and I do hereby declare that the following is a full, clear, and exact description thereof, reference being had to the accompanying drawings, and to the letters of reference marked thereon, making a part of this specification.

This invention relates to hose-nozzles; and the nature of my invention consists in a hose-nozzle which is formed of a drawn and spun metal tube provided with an annular rib or shoulder and an extension beyond the same, in combination with a spun-metal frusto-conical ring, which is screw-threaded, and which is loosely applied on the tubular nozzle and adapted for holding the end of a hose thereon and producing a self tightened or packed joint when there is a pressure of water in the hose, as will be fully understood from the following description, when taken in connection with the annexed drawings, in which—

Figure 1 is a side view of my improved hose-nozzle and coupling, indicating by dotted lines a rose nozzle or sprinkler as a substitute for the ejecting-tube. Fig. 2 is a diametrical section through the hose-nozzle, showing a hose coupled to it.

Similar letters of reference indicate corresponding parts in both figures.

The letter A designates a sheet-metal tube, which is made seamless by the well-known process of drawing. This tube A may have an ejecting-nozzle, B, formed on it, as indicated in full lines, Figs. 1 and 2; or, if desired, the end of the tube may have a sprinkler or rose-nozzle formed on it, as indicated in dotted lines, Fig. 1.

C designates a screw-threaded compressing and coupling ring, which is made from sheet metal by the well-known process of spinning, and which is constructed complete with an internal annular flange, *a*. This conical screw-threaded ring or coupling-collar is slipped over the rear end of the cylindrical portion of the nozzle B, after which, by well-known machinery, an annular bead or shoulder, E, is formed on the drawn tubular nozzle by the process of spinning. The ring C is thus loosely applied on the nozzle, and it is permanently attached thereto. When a single ejecting-nozzle is formed on the tubular portion thereof an annular bead or shoulder, E', is formed to prevent the said ring C from slipping off this end of the tube; but when the rose-nozzle is formed on the tube A the shoulder E' may be omitted. It will be observed that the annular shoulder E has a tubular extension, A', which is designed to prevent a casual detachment of the hose from the nozzle should the hose be deflected out of a straight line. When the hose is slipped over the tubular extension A', over the shoulder E, and for a short distance over the tube A proper, and the ring C is set up, as shown in Fig. 2, so as to extend over the end of the hose G and compress it against the shoulder E, a close joint is formed. When there is a pressure of water in the hose this pressure will cause a self tightening or packing of said joint, and as the pressure increases the joint will in an equal ratio be tightened.

I claim—

As a new and improved article of manufacture, a drawn and spun metal hose-nozzle having an annular shoulder and a tubular extension beyond said shoulder, in combination with a spun-metal conical coupling-ring loosely applied on said nozzle and permanently attached to it, substantially as described.

In testimony whereof I affix my signature, in presence of two witnesses, this 18th day of April, 1882.

F. HICKMAN.

Witnesses:
J. J. McCARTHY,
CHAS. D. DAVIS.